(12) United States Patent
Helmer et al.

(10) Patent No.: US 9,180,866 B2
(45) Date of Patent: Nov. 10, 2015

(54) CLUTCH DEVICE

(71) Applicant: Schaeffler Technologies GmbH & Co. KG, Herzogenaurach (DE)

(72) Inventors: Daniel Helmer, Achern-Fautenbach (DE); Florian Vogel, Buehl (DE); Christoph Raber, Ottweiler-Steinbach (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 14/364,845

(22) PCT Filed: Dec. 4, 2012

(86) PCT No.: PCT/DE2012/001154
§ 371 (c)(1),
(2) Date: Jun. 12, 2014

(87) PCT Pub. No.: WO2013/087055
PCT Pub. Date: Jun. 20, 2013

(65) Prior Publication Data
US 2014/0329640 A1    Nov. 6, 2014

(30) Foreign Application Priority Data
Dec. 14, 2011  (DE) .................. 10 2011 088 473

(51) Int. Cl.
*F16H 3/72*     (2006.01)
*B60W 20/00*    (2006.01)
*B60K 6/387*    (2007.10)
*F16D 28/00*    (2006.01)
(Continued)

(52) U.S. Cl.
CPC ................ *B60W 20/00* (2013.01); *B60K 6/387* (2013.01); *B60W 10/02* (2013.01); *B60W 20/40* (2013.01); *F16D 28/00* (2013.01); *B60K 2006/4825* (2013.01); *F16D 27/004* (2013.01); *F16D 2023/123* (2013.01); *Y02T 10/6252* (2013.01); *Y10S 903/902* (2013.01); *Y10T 477/26* (2015.01)

(58) Field of Classification Search
CPC ....... F16H 48/20; B60W 20/00; B60W 10/02; B60W 20/40; F16D 2023/123; F16D 27/004; F16D 23/00
USPC .................................................. 475/5; 192/20
See application file for complete search history.

(56) References Cited

U.S. PATENT DOCUMENTS 5,562,265 A * 10/1996 Rauckhorst, III ......... 244/134 R
6,666,315 B2 * 12/2003 Organek et al. ............. 192/84.7
(Continued)

FOREIGN PATENT DOCUMENTS

DE        3834555 C1    9/1989
DE    102008006062 A1    2/2009
(Continued)

*Primary Examiner* — David J Hlavka
(74) *Attorney, Agent, or Firm* — Simpson & Simpson, PLLC

(57) ABSTRACT

A clutch device having an actuating device for a drivetrain of a motor vehicle having an internal combustion engine, an electric machine with a stator and a rotor, and a transmission device, where the clutch device is situated in the drivetrain between the internal combustion engine on the one side and the electric machine and the transmission device on the other side, the clutch device and the actuating device being integrated into the rotor of the electric machine, in order to improve the construction and/or the function of the clutch device.

13 Claims, 2 Drawing Sheets

(51) Int. Cl.
*B60W 10/02* (2006.01)
*F16D 27/00* (2006.01)
*F16D 23/12* (2006.01)
*B60K 6/48* (2007.10)

(56) References Cited

U.S. PATENT DOCUMENTS

| | | | |
|---|---|---|---|
| 6,746,354 B1 * | 6/2004 | Ziemer | 475/5 |
| 7,896,146 B2 * | 3/2011 | Pritchard et al. | 192/84.6 |
| 2004/0084979 A1 | 5/2004 | Hughes et al. | |
| 2007/0213160 A1 * | 9/2007 | Lyons et al. | 475/5 |
| 2010/0261565 A1 * | 10/2010 | Ai et al. | 475/5 |
| 2013/0274047 A1 * | 10/2013 | Gotz | 475/5 |

FOREIGN PATENT DOCUMENTS

| | | |
|---|---|---|
| DE | 102010048830 A1 | 5/2011 |
| EP | 0677414 A2 | 10/1995 |

* cited by examiner

CLUTCH DEVICE

CROSS-REFERENCE TO RELATED APPLICATIONS

The present application is the U.S. national stage application pursuant to 35 U.S.C. §371 of international Application No. PCT/DE2012/001154, filed Dec. 4, 2012, which application claims priority of German Application No. 10 2011 088 473.4, filed Dec. 14, 2011.

FIELD OF THE INVENTION

The invention relates to a clutch device having an actuating device for a drivetrain of a motor vehicle having an internal combustion engine, an electric machine with a stator and a rotor, and a transmission device, wherein the clutch device is situated in the drivetrain between the internal combustion engine on the one side and the electric machine and the transmission device on the other side.

BACKGROUND OF THE INVENTION

From German Patent Application No, 10 2010 048 830 A1 a clutch unit is known in a drivetrain of a motor vehicle having an internal combustion engine with a crankshaft and a transmission having a transmission input shaft having a first friction clutch including a first counter-pressure plate and an axially movable first pressing plate received non-rotatingly on the first counter-pressure plate, which is braced by a diaphragm spring against the first counter-pressure plate, with friction linings of a first clutch plate interposed, which is connected non-rotatingly to the transmission input shaft, and having a second friction clutch including a second counter-pressure plate and an axially movable pressing plate received non-rotatingly on the second counter-pressure plate, which pressing plate is braceable in the direction of the second counter-pressure plate, with friction linings of a second clutch plate interposed which is connected to the transmission input shaft, where the second counter-pressure plate is operatively connected to the crankshaft, the first counter-pressure plate is rotatably supported on the second counter-pressure plate, and an axially operative ramp device is situated between the first counter-pressure plate and the second pressing plate in order to provide an enlarged capacity of transmissible torque with little actuating force. For more detailed information about the features of the present invention, we refer explicitly to German Patent Application No 10 2010 048 830 A1. The theory of that publication is to be regarded as a component of the present document. Features of that publication are features of the present document.

From German Patent Application No. 10 2008 006 062 A1 a drivetrain is known in a motor vehicle having an internal combustion engine and a starter-generator, where means of a starting clutch running in oil the rotary connection can be produced in the flow of power between the internal combustion engine on the one hand and the starter-generator and the transmission on the other hand, where the rotor of the starter-generator is supported—at least indirectly—a clutch cover, and the clutch cover is connected non-rotatingly and oil-tight to the clutch bell housing of the transmission, in order to make the drive train more cost-effective and space-saving.

BRIEF SUMMARY OF THE INVENTION

The object of the invention is to improve structurally and/or functionally a clutch device named at the beginning.

The object of the invention is fulfilled by a clutch device having an actuating device for a drivetrain of a motor vehicle having an internal combustion engine, an electric machine with a stator and a rotor, and a transmission device, where the clutch device is situated in the drivetrain between the internal combustion engine on the one side and the electric machine and the transmission device on the other side, the clutch device and the actuating device being integrated into the rotor of the electric machine.

The internal combustion engine, the clutch device, the electric machine and the transmission device may be arranged in the drivetrain in the named order. A torsional vibration damper, for example, a dual-mass flywheel, may be situated in the drivetrain. The torsional vibration damper may have an input part, an output part, which is rotatable relative to the input part, and at least one energy storage device which operates between the input part and the output part. The terms "input part" and "output part" are in reference to a power stream coming from the internal combustion engine. The torsional vibration damper may be situated in the drivetrain between the internal combustion engine and the clutch device. The torsional vibration damper may be situated in the drivetrain between the internal combustion engine and the electric machine. The input part of the torsional vibration damper may be drive-connected to the internal combustion engine. The output part of the torsional vibration damper may be drive-connected to the clutch device. The output part of the torsional vibration damper may be drive-connected to the electric machine. At least one drivable wheel may be situated in the drivetrain. The at least one drivable wheel may be situated in the drivetrain following the transmission device.

The motor vehicle may have a hybrid drive. The motor vehicle may have a first energy converter. The first energy converter may be the internal combustion engine. The internal combustion engine may be operable using a hydrocarbon, such as gasoline, diesel, or natural gas (liquefied petroleum gas, LPG, or compressed natural gas, CNG). The internal combustion engine may be operable using hydrogen. The motor vehicle may have a first energy storage device. The first energy storage device may be a fuel tank. The motor vehicle may have a second energy converter. The second energy converter may be the electric machine. The electric machine may be operable as an electric motor. The electric machine may be operable as a generator. The electric machine may structurally unite an electric motor and a generator. The electric machine may be a starter-generator. The motor vehicle may have a second energy storage device. The second energy storage device may be an electric energy storage device. The second energy storage device may be an accumulator. The energy converters may serve to drive the motor vehicle. Mechanical power may be producible with the aid of the energy converters. The motor vehicle may have a parallel hybrid drive. The motor vehicle may have a full hybrid drive.

The clutch device may have a friction clutch. The clutch device may have a dry clutch. The clutch device may have a single disk clutch. The clutch device may have a wet clutch. The clutch device may have a multiple disk clutch. The clutch device may have a pressing plate. The clutch device may have at least one intermediate pressure plate. The clutch device may have a pressure plate. The clutch device may have at least one clutch plate. The at least one clutch plate may have friction linings. Intermediate pressure plates and clutch plates may be positioned alternatingly. The at least one clutch plate may be clampable between the pressing plate, the at least one intermediate pressure plate, and/or the pressure plate.

The clutch device may be situated in the drivetrain between the internal combustion engine and the electric machine. The clutch device may be situated in the drivetrain between the internal combustion engine and the rotor of the electric machine. The clutch device may have an input part and an output part. The terms "input part" and "output part" are in reference to a power stream directed toward a drivable wheel of the motor vehicle. The input part of the clutch device may have the at least one clutch plate. The input part of the clutch device may be drive-connected to the internal combustion engine. The output part of the clutch device may have the pressing plate, the at least one intermediate pressure plate, and/or the pressure plate. The output part of the clutch device may be drive-connected to the electric machine. The output part of the clutch device may be drive-connected to the rotor of the electric machine. The clutch device may be situated in the drivetrain between the internal combustion engine and the transmission device. The output part of the clutch device may be drive-connected to the transmission device. The output part of the clutch device may be drive-connected to an input shaft of the transmission device. The clutch device may be situated in the drivetrain between the torsional vibration damper and the electric machine. The input part of the clutch device may be drive-connected to the torsional vibration damper. The input part of the clutch device may be drive-connected to the output part of the torsional vibration damper. The clutch device may be situated in the drivetrain between the torsional vibration damper and the transmission device.

The clutch device, starting from a completely disengaged actuating position, in which there is essentially no transmission of power between the input part and the at least one output part, may enable an increasing transmission of power, depending on actuation, all the way to a completely engaged actuating position, in which there is essentially complete transmission of power between the input part and the at least one output part, where a transmission of power between the input part and the at least one output part may take place non-positively, fo example, by frictional engagement. Conversely, starting from a completely engaged actuating position, in which there is essentially complete transmission of power between the input part and the at least one output part, a decrease in transmission of power may be enabled, depending on actuation, all the way to a completely disengaged actuating position, in which there is essentially no transmission of power. A completely engaged actuating position may be a closed actuating position. A completely disengaged actuating position may be an open actuating position.

The clutch device may have a torque sensor. The torque sensor may be situated at the input part of the clutch device. The torque sensor may have an input part, an output part, which is rotatable relative to the input part, and at least one energy storage device, which operates between the input part and the output part. A torque may be determinable contrary to a force of the energy storage device, due to a relative rotation between the input part and the output part. The clutch device may be regulated with the help of the torque sensor.

The transmission device may have an input shaft and an output shaft. The terms "input shaft" and "output shaft" are in reference to a power stream coming from the internal combustion engine or from the electric machine. The transmission device may have a multi-step transmission. The transmission device may have a continuously variable transmission. The transmission device may have a dual-clutch transmission. The transmission device may have a torque converter clutch transmission. The transmission device may be manually shiftable. The transmission device may be automatically shiftable. The input shaft may be drive-connected to the electric machine. The input shaft may be drive-connected to the rotor of the electric machine. The input shaft may be drive-connected to the clutch device. The input shaft may be drive-connected to the output part of the clutch device. The output shaft may be drive-connected to the at least one drivable wheel.

The electric machine may have a housing. The stator may be fixed in relation to the housing. The stator may be situated radially outside of the rotor. The electric machine may have at least one shaft or hub. The rotor may be fixed on the at least one shaft or hub. The rotor may be situated radially inside the stator. The electric machine may have a first shaft or hub and a second shaft or hub. The first shaft or hub and the second shaft or hub may be positioned coaxially. The rotor may be fixed on the second shaft or hub. The first shaft or hub may be assigned to the input part of the clutch device. The second shaft or hub may be assigned to the output part of the clutch device. The rotor may have a capsule-like form. The rotor may have the form of a tubular segment. The rotor may have a hollow cylindrical form. A receiving space may be formed in the rotor.

A clutch device integrated into the rotor may be a clutch device that is situated at least essentially inside the rotor. A clutch device integrated into the rotor may be a clutch device that is situated radially at least essentially inside the rotor. A radial direction is a direction perpendicular to an axis of rotation of the electric machine. A clutch device integrated into the rotor may be a clutch device that is situated axially at least essentially inside the rotor. An axial direction is a direction of extension of an axis of rotation of the electric machine. An actuating device integrated in the rotor may be an actuating device, which is situated at least essentially inside the rotor. An actuating device integrated in the rotor may be an actuating device, which is situated radially at least essentially inside the rotor. An actuating device integrated in the rotor may be an actuating device, which is situated axially at least essentially inside the rotor. The clutch device and the actuating device may be situated one after the other in the direction of extension of an axis of rotation of the clutch device. The actuating device may be situated on a side facing the internal combustion engine. The clutch device may be situated on a side facing the transmission device.

The pressing plate of the clutch device may be movable axially with the help of the actuating device. The clutch device may be opened or closed with the help of the actuating device. The clutch device may be engaged or disengaged with the help of the actuating device.

Using the clutch device, the internal combustion engine may be connected to or disconnected from the drivetrain. The internal combustion engine may be connected to the electric machine, for example, to the rotor, or disconnected from the electric machine, for example, from the rotor. The internal combustion engine may be connected to the transmission device, for example, to the transmission input shaft, or disconnected from the transmission device, for example, from the transmission input shaft. Only a small construction space is needed. The existing construction space is used in an optimized manner.

The actuating device may have a ramp device with first ramps and second ramps. The actuating device may be self-amplifying. This enables shifting of a comparatively high output with comparatively little actuating force. An actuating force may be self-amplified. Thus, a reduced actuating energy is needed in order to engage and/or disengage the clutch device. Reduced actuating force is necessary. Reduced actuating travel is necessary. An actuator may have reduced power. An actuator may have reduced power consumption. An actuator may have a reduced construction space. An actuator may have reduced weight. A shifting speed may be increased. The ramp device, starting from a motion in the circumferential direction of the clutch device, may enable a motion in the direction of extension of the axis of rotation of the clutch device. The ramp device may be axially operative.

There may be rolling elements, for example, balls, situated between the first ramps and the second ramps. The ramps may form running surfaces for the rolling elements. The ramps may be designed as rolling element ramps, for example, as ball ramps. The ramps may be distributed in the circumferential direction of the clutch device. The ramps may be oblique to a plane, which is perpendicular to the axis of rotation of the clutch device. The ramps may rise and/or fall in the circumferential direction of the clutch device. The ramps may rise on one side. The ramps may rise on both sides. The first ramps and the second ramps may be designed to be geometrically complementary to each other. The first ramps may correspond to the second ramps in such a way that when the first ramps and the second ramps move in the circumferential direction of the clutch device relative to each other, the first ramps and the second ramps move away from each other or toward each other in the direction of extension of the axis of rotation of the clutch device. The first ramps may support the rolling elements from radially inside. The second ramps may support the rolling elements from radially outside. The rolling elements may have a diameter such that they are held safe from loss between the first ramps and the second ramps. The rolling elements may be situated in a rolling element cage. This ensures a uniform assignment of the rolling elements to the ramps.

The actuating device may have an epicyclic gear system, having a ring gear, a sun gear, a plurality of planet gears and a link. The epicyclic gear system may be a planetary gear system. The ring gear may have internal toothing. The sun gear may have external toothing. The planet gears may each have external toothing. The planet gears may be engaged with the ring gear and the sun gear. The epicyclic gear system may have a first transmission shaft, a second transmission shaft and a third transmission shaft. The ring gear may be situated on the first transmission shaft. The sun gear may be situated on the second transmission shaft. The planet gears may be situated on the third transmission shafts. The first transmission shaft and the second transmission shaft may have coaxial axes. The axes of the third transmission shaft may be parallel to the axes of the first transmission shaft and the second transmission shaft, and spaced apart from them. During operation of the epicyclic gear system, the planet gears may circulate around the sun gear. The link may be a planet carrier. The link may connect the third transmission shafts firmly to each other, or may contain the third transmission shafts.

With regard to the ramp device, the first ramps may be assigned to the link and the second ramps to the ring gear. The first ramps may initially be structurally separated, and subsequently connected to the link. The first ramps may be integrated into the link. The first ramps may be sections of the link. The second ramps may initially be structurally separated, and subsequently connected to the ring gear. The second ramps may be integrated into the ring gear. The second ramps may be sections of the ring gear.

The clutch device may have a pressing plate, and the ring gear may be assigned to the pressing plate. The pressing plate may be movable axially to a limited extent. The ring gear may initially be structurally separated, and subsequently connected to the pressing plate. The ring gear may be connected to the pressing plate positively, non-positively, for example, frictionally, and/or by integral joining. The ring gear may be integrated into the pressing plate. The ring gear may be formed with a section of the pressing plate.

The actuating device may have an electric actuator, which acts on the sun gear. With the help of the actuator, the sun gear may have a pilot torque applied to it. With the help of the actuator, the sun gear may have a torque applied to it which acts contrary to a rotation of the epicyclic gear system, in such a way that the link with the first ramps and the ring gear with the second ramps rotate relative to each other. The actuating device may have an electric actuator, which acts on the link. With the help of the actuator, the link may have a pilot torque applied to it. With the help of the actuator, the link may have a torque applied to it which acts contrary to a rotation of the epicyclic gear system, in such a way that the link with the first ramps and the ring gear with the second ramps rotate relative to each other. The actuating device may have an electric actuator, which acts on the ring gear. With the help of the actuator, the ring gear may have a plot torque applied to it. With the help of the actuator, the ring gear may have a torque applied to it which acts contrary to a rotation of the epicyclic gear system, in such a way that the link with the first ramps and the ring gear with the second ramps rotate relative to each other. The actuator may be a brake. The actuator may be an eddy current brake. An electric control device may be provided to actuate the eddy current brake.

The clutch device may be adjustably movable between a completely open actuating position, intermediate positions, and a completely closed actuating position. An adjusted repositioning may take place with the help of a control device. At least one output signal may be issuable by the control device. An output signal may be issuable by the control device to the actuator of the clutch device. The control device may have at least one input signal available. At least one parameter may be stored in the control device. At least one parameter may be ascertainable with the help of the control device. The at least one output signal may be generatable on the basis of the at least one input signal, at least one stored parameter, and/or at least one ascertained parameter.

The clutch device may be self-regulating in the completely closed actuating position. A pilot torque for closing the clutch device may be provided by the internal combustion engine. The link of the epicyclic gear system may have a torque produced by the internal combustion engine applied to it that may be applied to the clutch device in the closing direction. This makes it unnecessary to actuate the clutch device with the help of the electric actuator in order to maintain the closed actuating position. Electric energy is not necessary.

The actuating device may have a freewheel mechanism. The free wheel mechanism may have an inner ring and an outer ring. The freewheel mechanism may have clamping elements. The clamping elements may act between the inner ring and the outer ring. With the help of the freewheel mechanism, rotation of the inner ring and outer ring relative to each other may be enabled in a first direction of rotation, and blocked in a second direction of rotation which is opposed to the first direction of rotation. The inner ring may be assigned to the first shaft or hub of the electric machine. The outer ring may be assigned to the link of the epicyclic gear system. This makes self-regulation of the actuating device possible not only in the completely closed actuating position of the clutch device, but also in all intermediate states of the clutch device. Push operation of the internal combustion engine is made possible. For example, the push operation may be realized through actuation of the eddy current brake. To this end, a torque must be applied to the eddy current brake, like when starting the combustion engine. The combustion engine is then dragged along, and is thus, able to transmit the drag torque.

In summary, the invention yields, among other things, an e-clutch. An "e-clutch" may be an electrically operable clutch. The clutch may be placed in a rotor of an e-motor of a hybrid. The clutch may ensure a disconnecting or connecting of an e-machine with a combustion engine. In so doing, the following operating states may be achieved by the clutch: during purely electrical driving the clutch may be disengaged and the combustion engine uncoupled from a drivetrain (combustion engine off); if more power or torque is needed, the combustion engine may be started by means of the e-motor by partially engaging the clutch; the clutch may go into push mode in order to start the combustion engine; it should be possible in this state to precisely regulate the torque transmitted by the clutch; this can be carried out by means of an electric actuator with variably adjustable torque; with the combustion engine running, the clutch can be engaged, in order to transmit the torque of the combustion engine into the drivetrain; in this state, the clutch can be self-regulating, and not require any electric energy.

BRIEF DESCRIPTION OF THE DRAWINGS

One exemplary embodiment of the invention will be described in greater detail below using figures as reference. This description will yield additional features and advantages. Concrete features of this exemplary embodiment can depict general features of the invention. Features of this exemplary embodiment combined with other features may also represent individual features of the invention.

The nature and mode of operation of the present invention will now be more fully described in the following detailed description of the invention taken with the accompanying drawing figures, in which.

DETAILED DESCRIPTION OF THE INVENTION

Figure 1:
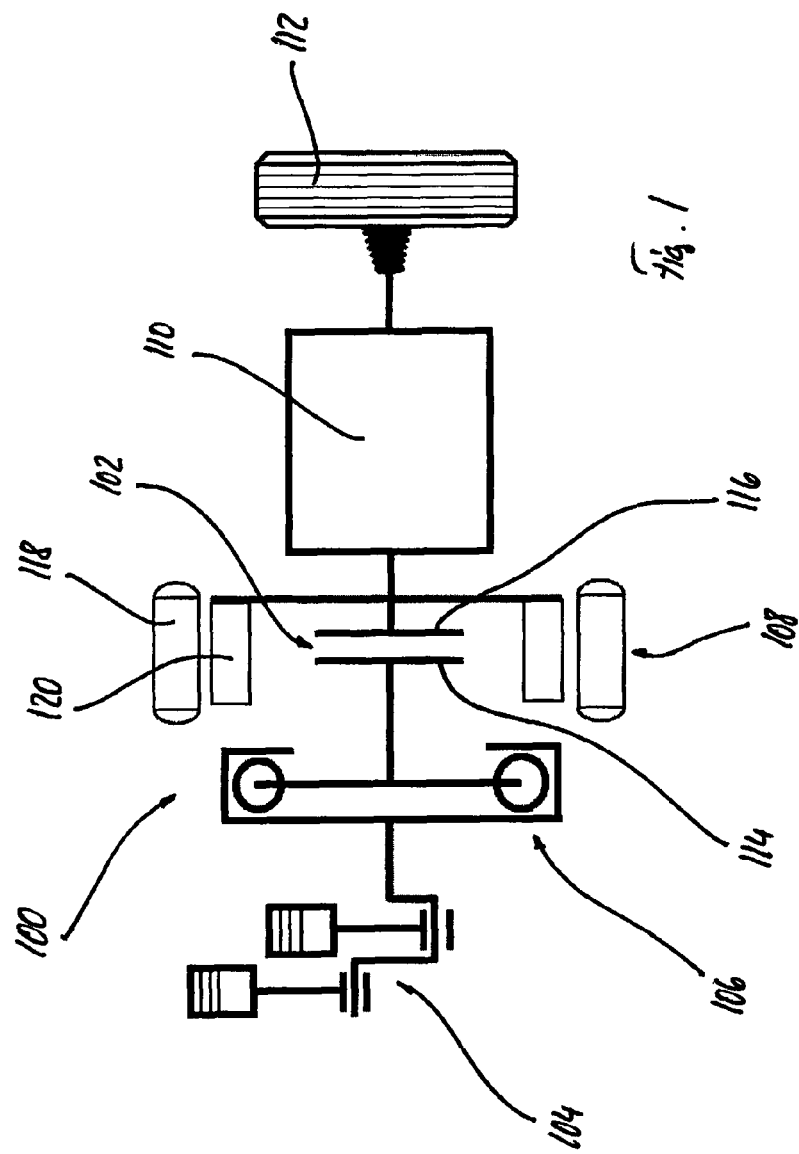
FIG. 1 shows a drivetrain of a motor vehicle, having a parallel full hybrid drive and a clutch situated in the drivetrain; and, FIG. 2 shows a clutch with an actuating device, integrated in a rotor of an electric machine, for a motor vehicle having a hybrid drive.

FIG. 1 shows drivetrain 100 of a motor vehicle, of which no other details are shown here, having a parallel full hybrid drive and clutch 102 situated in drivetrain 100. Drivetrain 100 has internal combustion engine 104, dual-mass flywheel 106, clutch 102, electric machine 108, transmission 110 and at least one drivable wheel 112. Electric machine 108 is operable as a motor. Clutch 102 is situated in drivetrain 100 between dual-mass flywheel 106 and electric machine 108. Clutch 102 is situated in drivetrain 100 between dual-mass flywheel 106 and transmission 110.

Clutch 102 has input part 114 and output part 116. Input part 114 of clutch 102 is connected to dual-mass flywheel 106. Output part 116 of clutch 102 is connected to electric machine 108. Electric machine 108 has stator 118 and rotor 120. Output part 116 of clutch 102 is connected to rotor 120 of electric machine 108. Output part 116 of clutch 102 is connected to transmission 110. Electric machine 108 is connected to transmission 110. Output part 120 of clutch 108 is connected to transmission 110.

Figure 2:
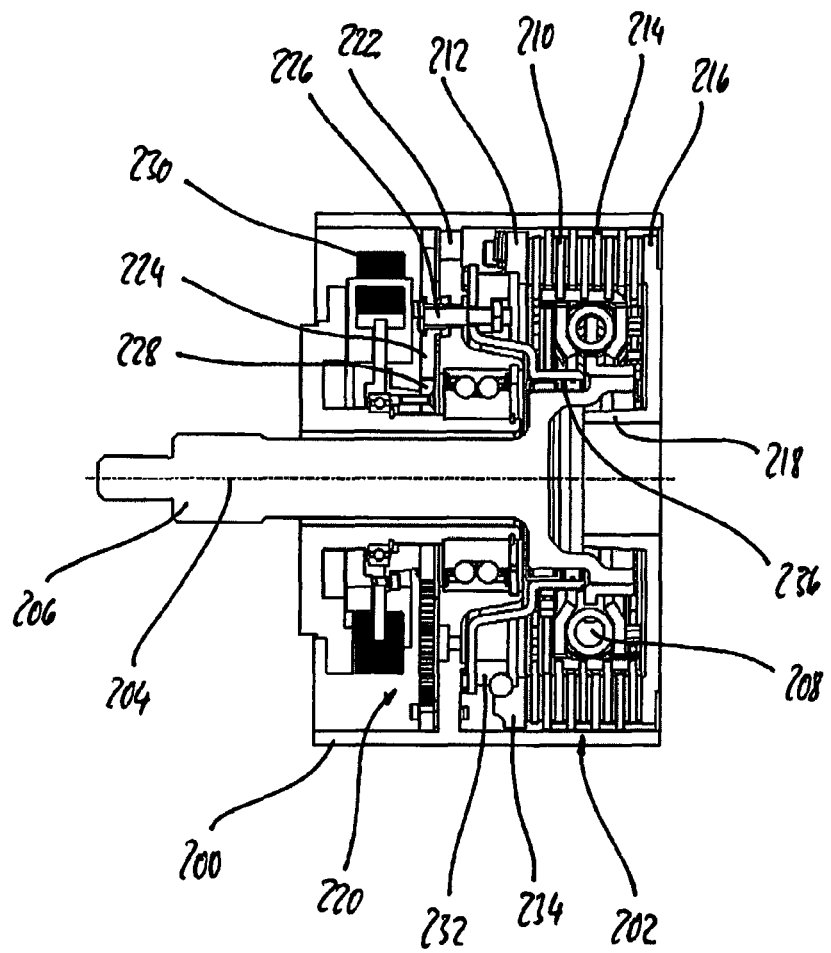

FIG. 2 shows clutch 202 integrated into rotor 200 of an electric machine of which no other details are shown here, as with clutch 102 of FIG. 1, having actuating device 220, for a motor vehicle with hybrid drive.

Clutch 202 is situated in the direction of extension of axis of rotation 204, as well as in the radial direction within rotor 200. Clutch 202 has an input part and an output part. The input part has shaft 206, torque sensor 208, and clutch plates 210. The output part of clutch 202 has pressing plate 212, intermediate pressure plates 214, pressure plate 216 and hub part 218. Clutch plates 210 are connected non-rotatingly to shaft 206. Pressing plate 212, intermediate pressure plates 214 and pressure plate 216 are connected non-rotatingly to hub part 218. Pressing plate 212, intermediate pressure plates 214 and pressure plate 216 are connected non-rotatingly to rotor 200. Pressing plate 212 is movable axially to a limited extent in the direction of extension of axis of rotation 204.

Actuating device 220 is provided to operate clutch 202. Actuating device 220 is situated in the direction of extension of axis of rotation 204, as well as in the radial direction within rotor 200. An actuating force may be applied to pressing plate 212 with the help of actuating device 220. Pressing plate 212 is movable axially with the help of actuating device 220. Actuating device 220 has a planetary gear set having ring gear 222, a plurality of planet gears 224, link 226 and sun gear 228. Ring gear 222 has internal toothing. Sun gear 228 has external toothing. Planet gears 224 each have external toothing, and are meshed with ring gear 222 and sun gear 228. Link 226 connects planet gears 224. Sun gear 228 is brakable with the help of an eddy current brake 230. Actuating device 220 has ramp device 220, with first ramps 232 and second ramps 234.

First ramps 232 and second ramps 234 are connected to each other through the planetary gear set. Second ramps 234 are situated on ring gear 222, and are connected to rotor 200 of the electric machine by means of leaf springs. First ramps 232 are situated on link 226 of the planetary gear set. A pilot torque may be introduced through sun gear 228 to actuate clutch 202.

During purely electric operation of the motor vehicle clutch 202 is disengaged. Ring gear 222, link 226 and sun gear 228 rotate at the same speed. This speed of rotation corresponds to the speed of rotation of the electric machine; the planetary gear set is "blocked," so to speak. As a result, rotation of first ramps 232 and second ramps 234 relative to each other, and thus, actuation of clutch 202, is prevented.

If an internal combustion engine connected to shaft 206 is to be started, eddy current brake 230 produces a pilot torque for clutch 202 on sun gear 228. This torque is a braking torque, and acts contrary to the rotary motion described above. Sun gear 228 is rotated relative to the formerly "blocked" planetary gear set. Through the function of the planetary gear set, planet gears 224, and hence, also link 226, are rotated relative to rotor 200 and to ring gear 222, which simultaneously corresponds to a turning of first ramps 232 and second ramps 234 relative to each other. When first ramps 232 and second ramps 234 are turned relative to each other, second ramps 234 move in the direction of extension of axis of rotation 204, and pressing plate 212 moves correspondingly. Clutch plates 210 are clamped between pressing plate 212, intermediate pressure plates 214 and pressure plate 216. A frictional transfer of power occurs between the input part and the output part of clutch 202.

The pilot torque of eddy current brake 230 is transmitted by a transmission ratio formed between sun gear 228 and link 226 on the planetary gear set and on ramps 232, 234 in such a way that the internal combustion engine can be started with the requisite torque. The pilot torque can be controlled precisely by means of a supply of electric power at eddy current brake 230, and can be built up in a very short time. The starting time of the internal combustion engine is a few milliseconds. The high transmission ratio of the torque and the short actuating time results in little actuating energy for starting the internal combustion engine. Furthermore, eddy current brake 230 is free of wear, and is able through a magnetic field of an electromagnet to realize any desired intermediate levels of the required torque, without torque fluctuations and dependencies on coefficients of friction.

When the internal combustion engine is running, the pilot torque is generated by means of the internal combustion engine itself and freewheel mechanism 236. In this operating state, clutch 202 transmits a traction torque. A specified portion of this traction torque is utilized through freewheel mechanism 236 as pilot torque for link 226. In that way, clutch 202 is actuated by a part of the torque of the internal combustion engine through ramps 232, 234. The torsional angle of ramps 232, 234 is regulated by means of torque sensor 208. In addition, torque sensor 208 makes it possible for clutch 202 to disengage again, as soon as there is no longer any torque being applied. Because of this arrangement of the components, clutch 202 is self-regulating this state and requires no additional external energy for actuation.

This state enables the operating conditions such as load shifting, boosting and driving with the internal combustion engine. The system also allows push operation of the internal combustion engine. In this case, the ramp device is again actuated by means of freewheel mechanism 236, and clutch 202 is able to transmit a required drag torque to the combustion engine. At the same time, to engage the clutch the eddy current brake must be actuated again (as described earlier when starting the combustion engine).

LIST OF REFERENCE NUMERALS 100 drivetrain
102 clutch
104 internal combustion engine
106 dual-mass flywheel
108 machine
110 transmission
112 wheel
114 input part
116 output part
118 stator
120 rotor
200 rotor
202 clutch
204 axis of rotation
206 shaft
208 torque sensor
210 clutch plate
212 pressing plate
214 intermediate pressure plate
216 pressure plate
218 hub part
220 actuating device
222 ring gear
224 planet gear
226 link
228 sun gear
230 eddy current brake
232 ramp
234 ramp
236 freewheel mechanism

What is claimed is:

1. A clutch device comprising:
an input part including:
a shaft; and,
at least one clutch plate non-rotatably connected to the shaft;
an output part including:
a hub;
a pressing plate;
at least one pressure plate;
at least one intermediate pressure plate non-rotatably connected to the hub;
a rotor for an electric machine; and,
an actuating device including:
a component engaged with the at least one pressure plate; and,
only one single planetary gear set, wherein the only one single planetary gear set is arranged to axially displace the component to close the clutch device.

2. The clutch device as recited in claim 1, wherein the actuating device has a ramp device having first ramps and second ramps.

3. The clutch device as recited in claim 1, wherein the planetary gear set includes a ring gear, a sun gear, a plurality of planet gears, and a link.

4. The clutch device as recited in claim 3, wherein:
the actuating device has a ramp device having first ramps and second ramps; and,
the first ramps are assigned to the link and the second ramps are assigned to the ring gear.

5. The clutch device as recited in claim 3, wherein the ring gear is assigned to the pressing plate.

6. The clutch device as recited in claim 3, wherein the actuating device has an electric actuator which acts on the sun gear.

7. The clutch device as recited in claim 3, wherein:
the actuating device has a ramp device having first ramps and second ramps; and,
with the help of the actuator, the sun gear has a torque applied to it which acts contrary to a rotation of the planetary gear set, in such a way that the link with the first ramps and the ring gear with the second ramps rotate relative to each other.

8. The clutch device as recited in claim 1, wherein the clutch device is adjustably movable between a completely open actuating position, intermediate positions and a completely closed actuating position.

9. The clutch device as recited in claim 8, wherein the clutch device is self-regulating in the completely closed actuating position.

10. The clutch device as recited in claim 1, wherein the actuating device has a freewheel mechanism.

11. A clutch device comprising:
an input part including:
a shaft; and,
a plurality of clutch plates non-rotatably connected to the shaft;
an output part including:
a hub;
a pressing plate non-rotatably connected to the hub;
a pressure plate non-rotatably connected to the hub; and,
a plurality of intermediate pressure plates non-rotatably connected to the hub; and,
an actuating device including:
a planet gear;
a first ramp device connected to the planet gear; and,
a second ramp device engaged with the pressing plate, wherein:
the planet gear is arranged to rotate the first ramp device with respect to the second ramp device; and,
the rotation of the first ramp device with respect to the second ramp device is arranged to displace the pressing plate to clamp the plurality of clutch plates and the plurality of intermediate pressure plates between the pressing plate and the pressure plate to close the clutch.

12. The clutch device of claim 11, wherein:
every clutch plate included in the clutch device is non-rotatably connected to the shaft;

every intermediate pressure plate included in the clutch device is non-rotatably connected to the hub; and, the rotation of the first ramp device with respect to the second ramp device is arranged to clamp every clutch plate and every intermediate pressure plate included in the clutch device between the pressing plate and the pressure plate.

13. The clutch device of claim 11, wherein the pressing plate consists of only one single pressing plate.

* * * * *